Nov. 28, 1967   P. G. IVANCHICH   3,354,739
MULTIPLE SPEED RATIO POWER TRANSMISSION MECHANISM
WITH SYNCHRONOUS SPEED RATIO SHIFTS
Filed May 2, 1966   7 Sheets-Sheet 1
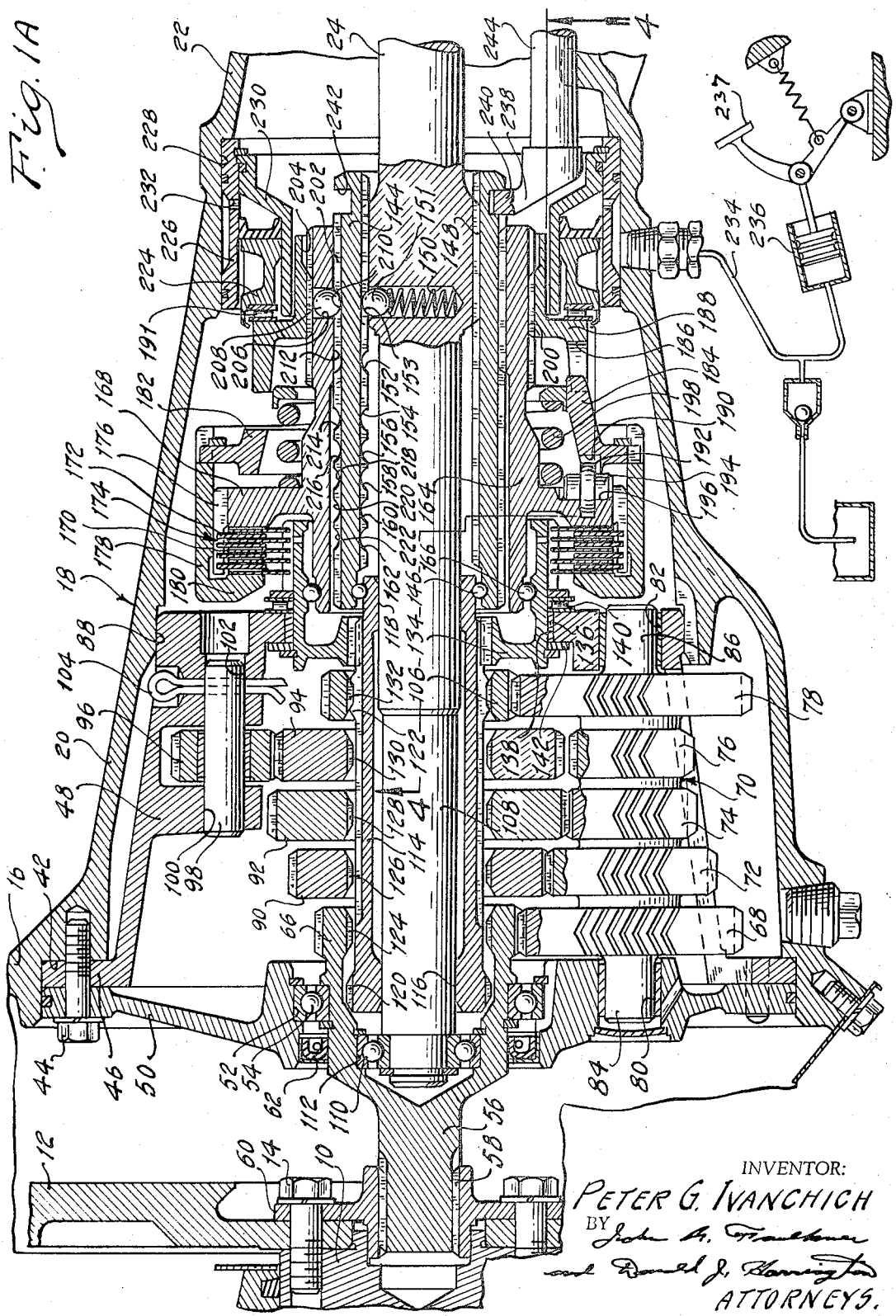
Fig. 1A
INVENTOR:
PETER G. IVANCHICH
BY
ATTORNEYS.

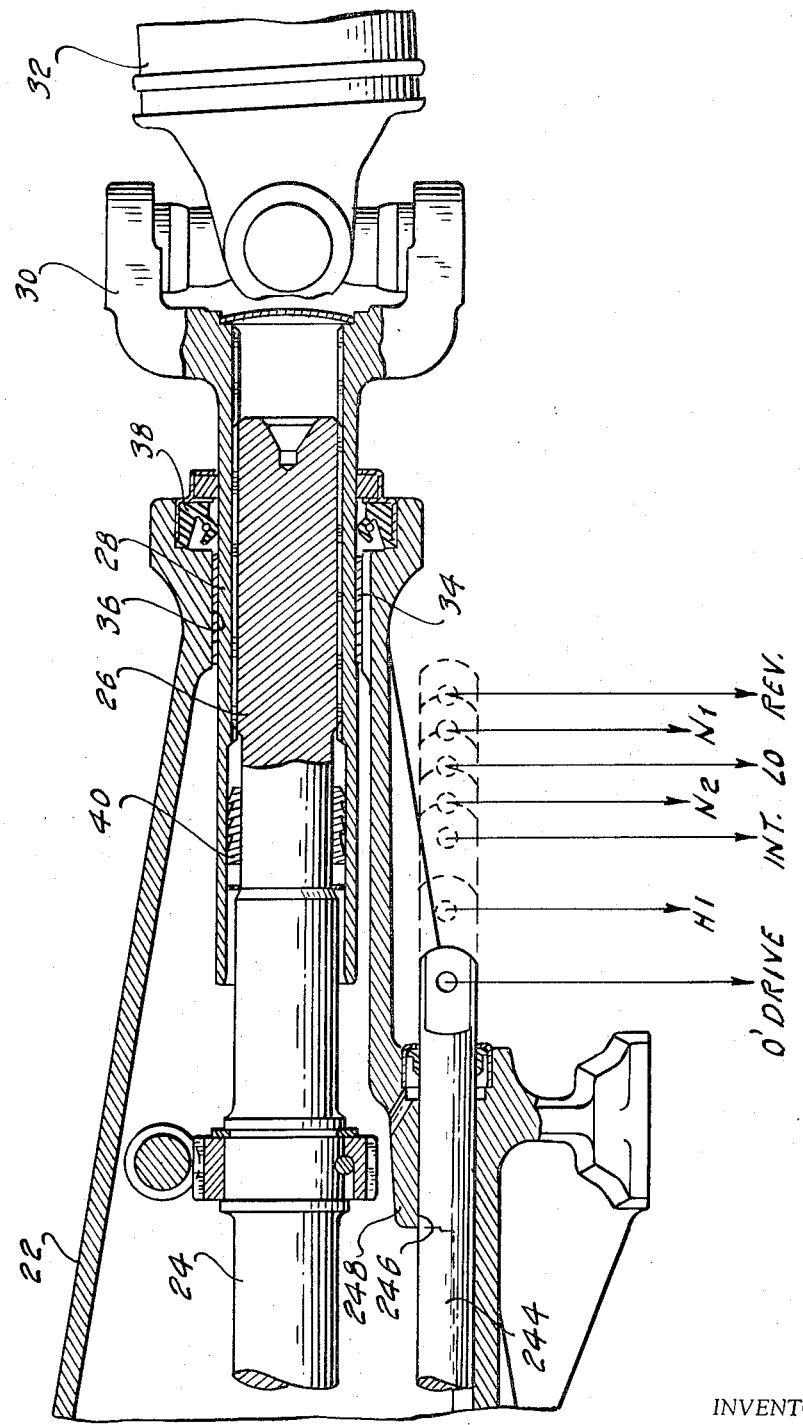

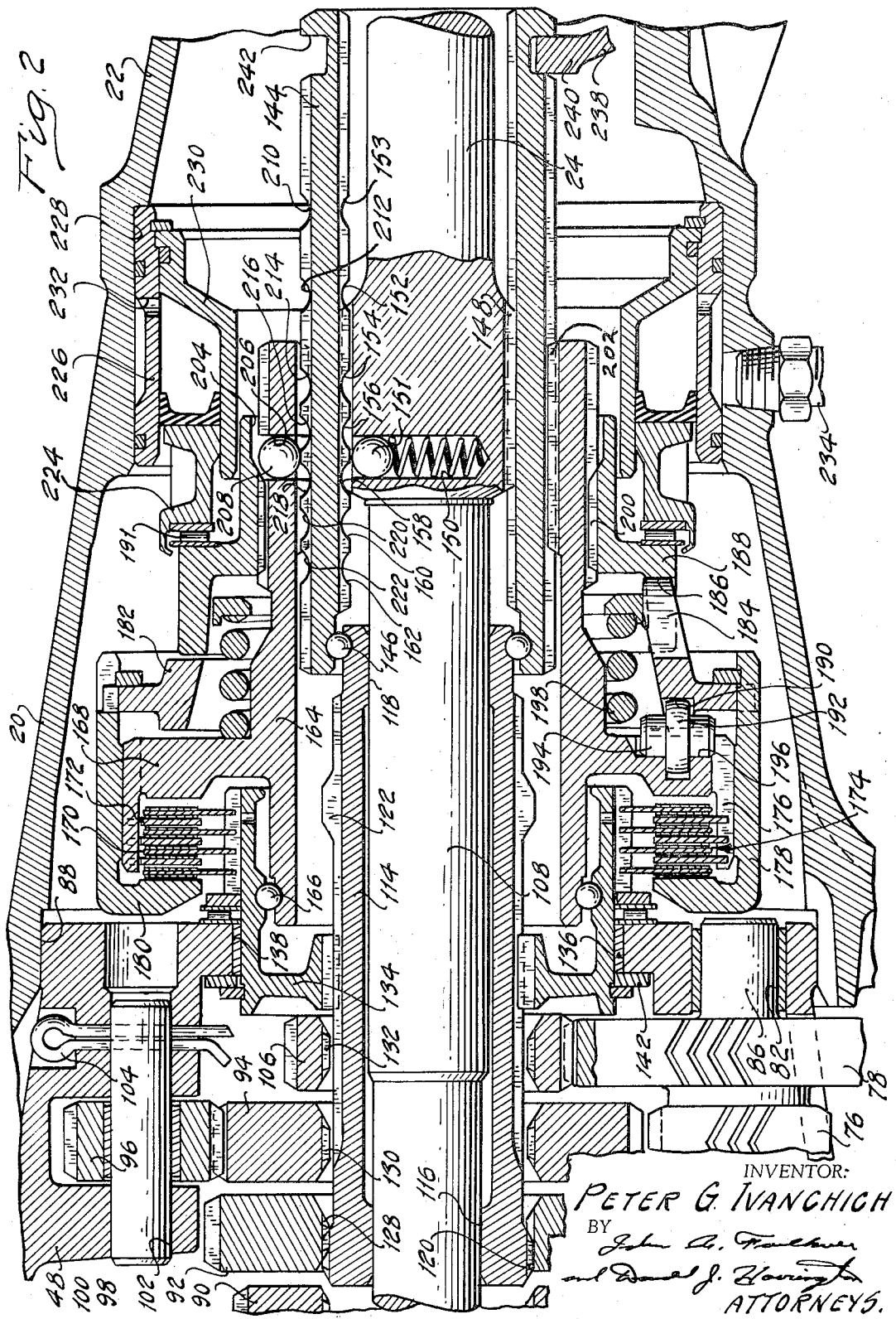

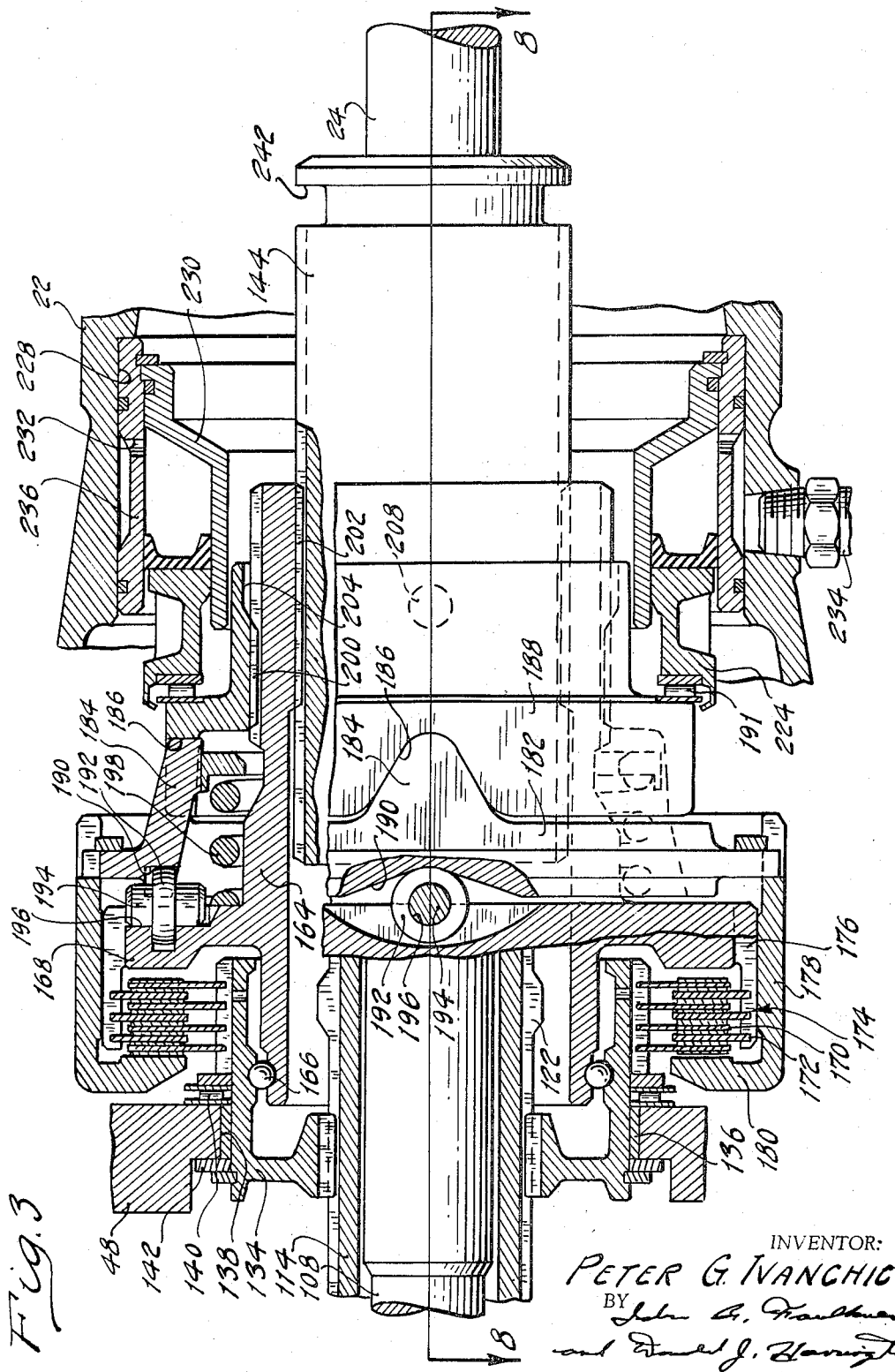

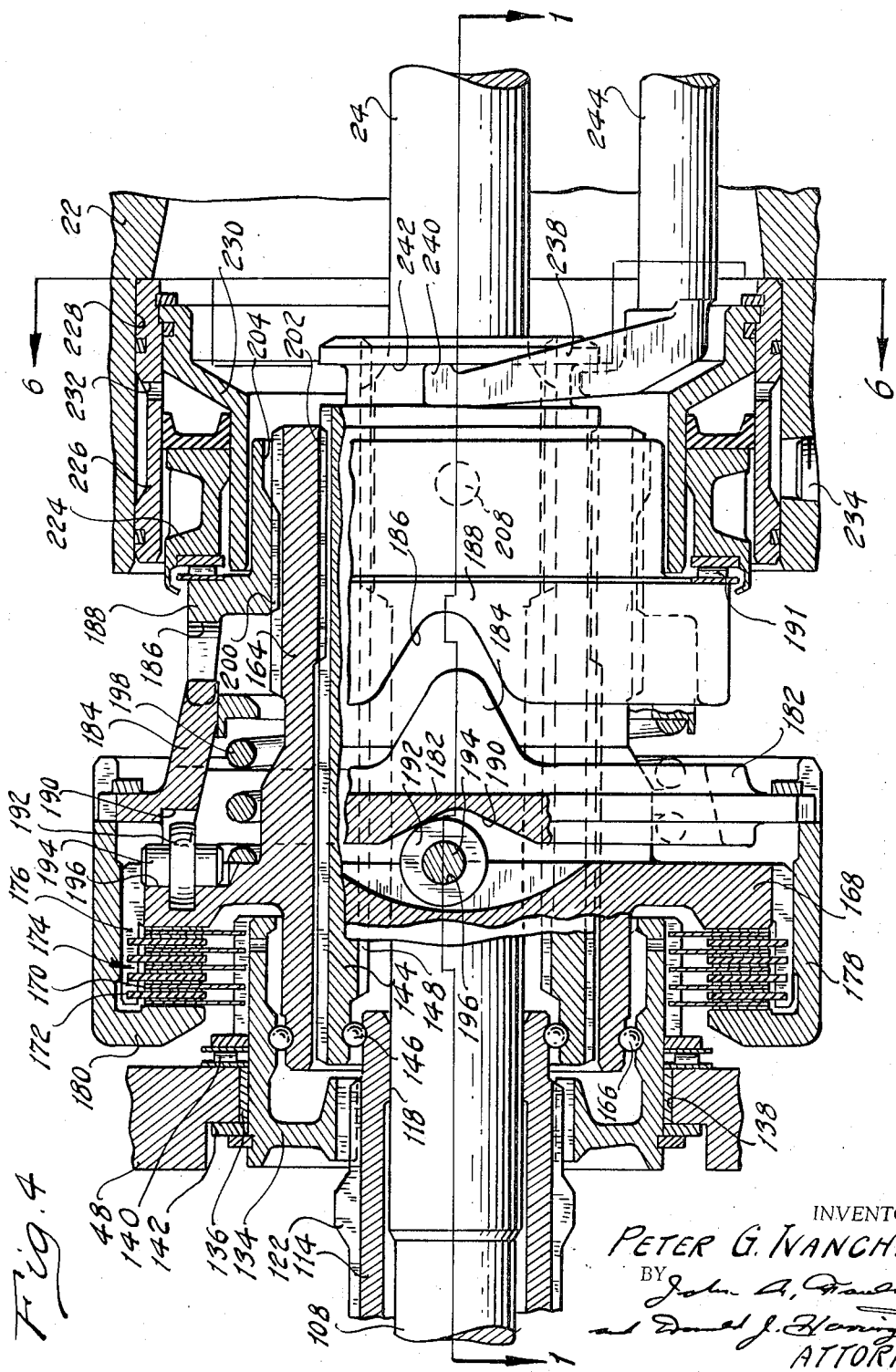

INVENTOR:
PETER G. IVANCHICH
ATTORNEYS.

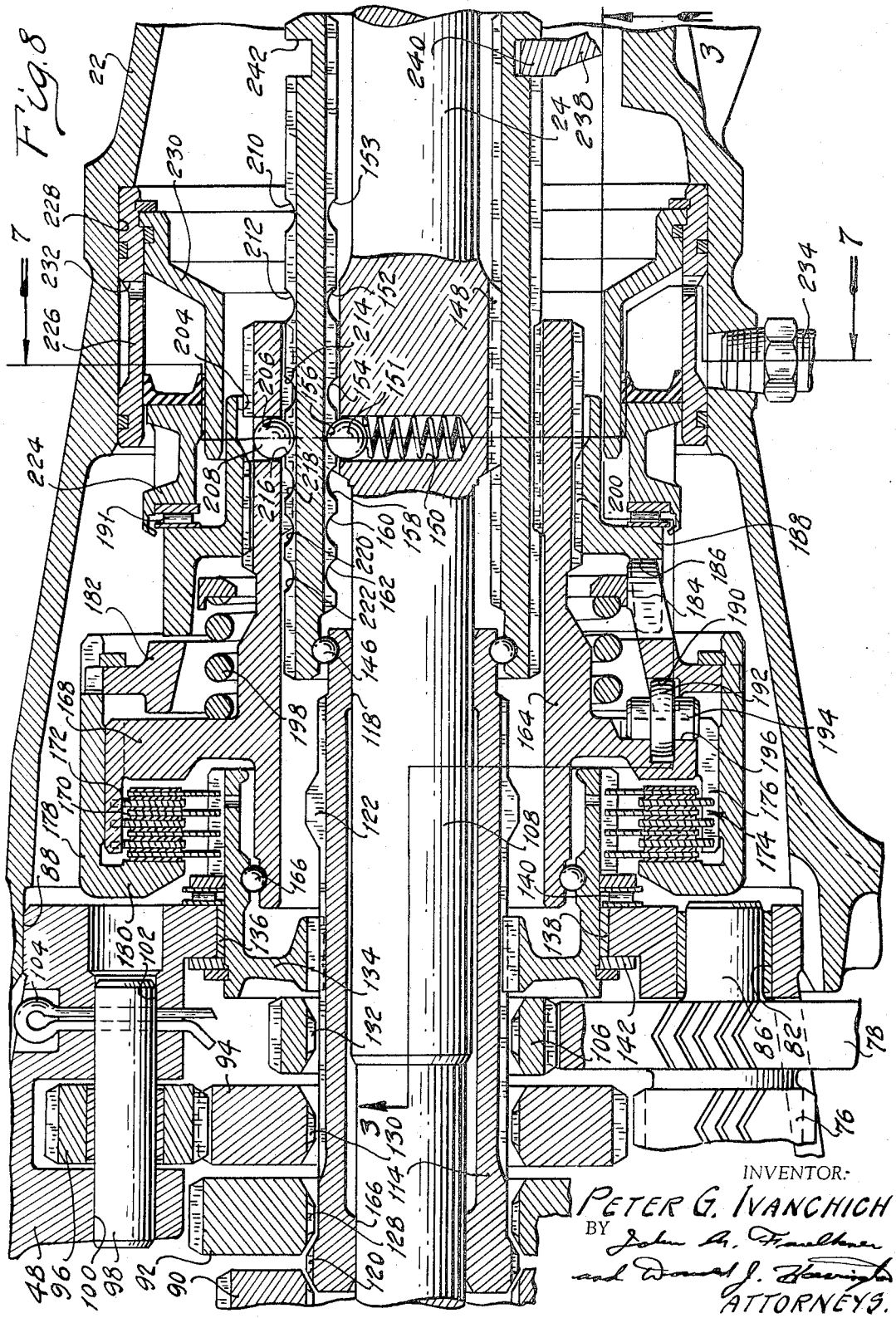

United States Patent Office 3,354,739
Patented Nov. 28, 1967

3,354,739
MULTIPLE SPEED RATIO POWER TRANSMISSION MECHANISM WITH SYNCHRONOUS SPEED RATIO SHIFTS
Peter G. Ivanchich, Dearborn, Mich., assignor to Ford Motor Company, Dearborn, Mich., a corporation of Delaware
Filed May 2, 1966, Ser. No. 546,745
16 Claims. (Cl. 74—339)

My invention relates generally to automotive vehicle drivelines, and more particularly to a multiple speed ratio power transmission gearing arrangement capable of establishing multiple torque delivery paths between the vehicle engine and the vehicle traction wheels.

In the embodiment disclosed herein, I have provided driver-operated manual controls for selecting the various ratios. I contemplate, however, that either semi-automatic or automatic controls can be used for accomplishing the ratio changes. If semi-automatic controls are used, the system would include a suitable fluid pressure source and a selector valve that controls distribution of pressure from the source to a fluid pressure-operated servo in the ratio changing mechanism. The valve would be controlled by a driver-operated selector lever.

If automatic controls are used, the valve can be made responsible to various pressure signals that sense the operating road conditions, such as vehicle speed and engine torque.

Unlike prior art arrangements, the multiple speed ratio power transmission mechanism of my invention eliminates the necessity for providing a linkage-operated neutral clutch between the vehicle engine and the power input gear element of the power transmission mechanism. The engine crankshaft is coupled directly to the power input element in my improved transmission system so that the torque delivery gear elements of the system are drivably coupled at all times during operation of the engine.

In prior art arrangements, it is necessary to engage and disengage the neutral clutch during shift intervals. When the neutral clutch is disengaged, it is necessary to establish synchronism between the torque delivery elements by means of a complex synchronizer clutch assembly as the torque delivery path is completed. After synchronism is established and the synchronizer clutch is engaged, the neutral clutch is re-engaged, thereby permitting engine torque to be delivered once again through the gearing arrangement. My improved mechanism eliminates the necessity for providing such a synchronizer clutch assembly.

The provision of a power transmission mechanism having the foregoing characteristics is a principal object of my invention.

It is another object of my invention to provide a power transmission mechanism having torque delivery gear elements drivably connected to the vehicle engine and wherein the torque delivery path may be interrupted at a point between the power output gear element of the mechanism and the driven shaft.

It is a further object of my invention to provide a power transmission mechanism for delivering power from an engine to a driven shaft wherein multiple ratios can be established selectively without the necessity for obtaining synchronism in the motion of the relatively movable members of the torque delivery driveline.

It is a further object of my invention to provide a power transmission mechanism for use on automotive vehicle drivelines wherein the torque input element of the gearing is connected directly to the engine crankshaft without the necessity for an intermediate, selectively engageable neutral clutch.

It is a further object of my invention to provide a power transmission mechanism of the type set forth in the preceding object wherein torque delivery paths established by the gearing can be interrupted by means of a common ratio controlling clutch structure.

It is a further object of my invention to provide a multiple speed ratio power transmission mechanism of the type above set forth wherein one of the forward driving ranges is an overdrive which permits the driven shaft to be driven at a speed that is greater than the speed of the engine crankshaft.

Further objects and features of my invention will become apparent from the following description and from the accompanying drawings wherein:

FIGURES 1A and 1B show in longitudinal cross-sectional form a preferred embodiment of my invention as viewed from the plane of section line 1—1 of FIGURE 4;

FIGURES 2 and 3 show a cross-sectional, partial assembly view of the ratio-changing clutch structure of FIGURE 1 as seen from the plane of section line 3—3 of FIGURE 8;

FIGURE 4 is a partial elevational view as seen from the plane of section line 4—4 of FIGURE 1A;

FIGURE 8 is a sectional view taken along section line 8—8 of FIGURE 3.

Figure 5:
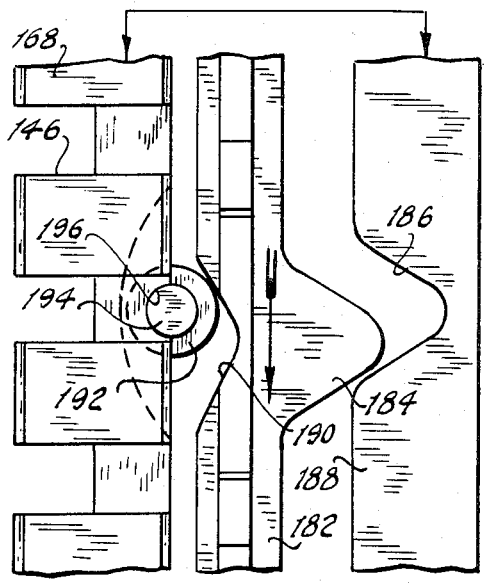
FIGURE 5 is a view similar to FIGURE 4, although it shows the drive member and the clutch pressure plate in a different relative angular position.
Figure 6:
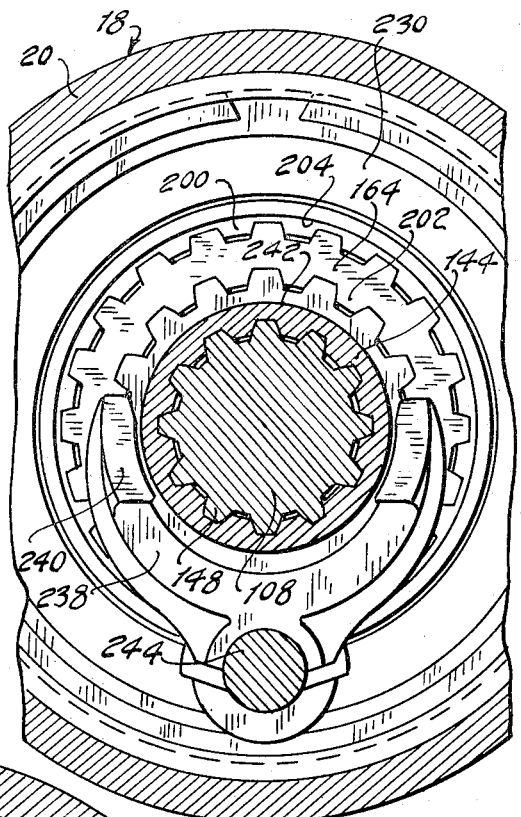
FIGURE 6 is a cross-sectional view taken along section line 6—6 of FIGURE 4.
Figure 7:
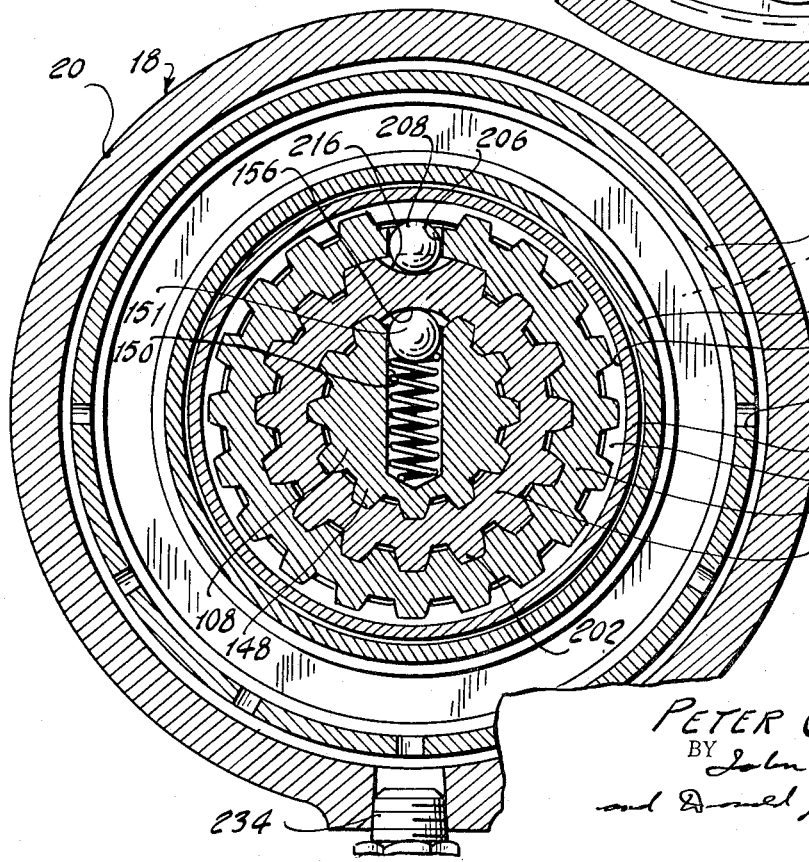
FIGURE 7 is a cross-sectional view taken along the plane of section line 7—7 of FIGURE 8.

In FIGURE 1A, numeral 10 designates the power output end of an engine crankshaft for an internal combustion vehicle engine. An inertia flywheel 12 is bolted by means of bolts 14 to the end of the crankshaft 10. Flywheel 12 is situated within a bell housing portion 16 of the transmission housing 18. By preference, the housing 18 can be formed as a single die casting, thereby eliminating the necessity for assembling separate housing portions. The torque transmitting capacity of such an integral housing, furthermore, is relatively high.

Housing 18 includes, in addition to the portion 16, a main portion 20 which encloses the torque transmitting gearing. It includes also a tailshaft extension housing portion 22, as shown in FIGURE 1B, which encloses the power output shaft indicated by reference character 24. Shaft 24 is splined at 26 to an internally splined slip yoke 28 having yoke arms 30 that form a part of a universal joint connection with a vehicle driveshaft 32. Slip yoke 28 is journalled by means of a bushing 34 within the bearing opening 36 in the right-hand end of the housing portion 22, a suitable fluid seal 38 being provided at that point as indicated. A suitable sliding seal 40 surrounds the shaft 24 at a location adjacent the splines 26.

At the juncture of the housing portions 16 and 20 there is provided an annular shoulder 42 to which is bolted, by means of bolts 44, the flange 46 of a removable transmission center support 48. Bolted also to the shoulder 42 is a transmission front end support 50 which extends transversely through the housing 18. Support 50 is in the form of a wall having a central opening 52 which receives a bearing 54 for a power input shaft 56. Shaft 56 in turn is splined at 58 to a hub 60. Bolts 14 secure the hub 60 to the flywheel 12 and to the crankshaft 10. A suitable fluid seal 62 is situated within a seal opening adjacent the bearings 54.

The periphery of the housing portion 16 may be bolted to the engine block of the vehicle engine, thereby providing a unitary transmission and engine assembly.

The shaft 56, which is connected directly to the engine crankshaft, delivers engine crankshaft torque directly to a power input gear 66. This gear meshes directly with gear element 68 of a cluster gear assembly 70. Gear assembly 70 comprises, in addition to the gear element 68, a gear element 72 for intermediate speed ratio operation, a low speed ratio gear element 74, a reverse drive gear element 76 and an overdrive gear element 78. All of the gear elements of the cluster gear assembly 70 are formed as part of a unitary assembly which is end-supported for rotation in bearing openings 80 and 82. Opening 80, which is formed in the wall 50, receives the end 84 of cluster gear assembly 70. Opening 82, which is formed in the center support 48, receives the other end 86 of the cluster gear assembly 70.

In order to provide added support and to prevent flexure of the center support 48, the housing portion 20 is formed with an annular supporting shoulder 88 which contacts and surrounds the right-hand end of the center support 48.

Intermediate speed ratio torque output gear 90 meshes continuously with gear element 72 of cluster gear assembly 70. In a similar fashion low speed ratio torque output gear 92 meshes continuously with gear element 74 of the cluster gear assembly 70. A reverse drive torque output gear 94 engages continuously a set of reverse drive pinions 96, preferably three in number, which are journalled for rotation about axes that are parallel to the axis of shaft 56.

In FIGURE 1A there is shown one pinion 96, although two others may be provided also in angularly spaced relationship about the axis of shaft 56. Pinion 96 is carried by pinion shaft 98 which is received within openings 100 and 102 formed in bosses carried by the center support 48. Shaft 98 can be held in place by a locking pin 104 received through a transverse opening formed in the center support 48 and through a tangentially disposed slot formed in the pin 98.

Reverse drive pinions 96 drivably mesh continuously with cluster gear element 76.

An overdrive torque output gear 106 meshes continuously with overdrive gear element 78 of the cluster gear assembly 70. Gears 66, 90, 92, 94 and 106 are adapted for rotation about a common axis which corresponds to the axis of shaft 56 and the axis of shaft 24.

There are three cluster gear assemblies, such as that shown at 70, located about the common axis of the torque output gears. They provide the only means for rotatably supporting the gears 90 and 92. In a similar fashion the reverse drive pinions 96 provide the only means for rotatably supporting the gear 94. Similarly, gear element 78 rotatably supports overdrive torque output gear element 106.

The gear elements of the cluster gear assemblies and the torque output gears, as well as the input gear 66, are formed with herringbone teeth, as indicated. The helix angularity of the teeth, by preference, is approximately 30° with respect to the longitudinal gear axis. This eliminates axial gear tooth thrust forces.

Shaft 24, as seen in FIGURES 1A and 2, is formed with a centrally mounted portion 108 which extends through the gears 66, 90, 92, 94 and 106. The forward or left-hand end of shaft portion 108 is journalled by means of a bearing 110 within a bearing recess 112 formed in the end of power input shaft 56. A clutch sleeve shaft 114 slidably positioned over shaft portion 108 is formed with a suitable bearing surface 116 at one end thereof and another bearing surface 118 at its other end. The left-hand end of sleeve shaft 114 carries external clutch teeth 120. External clutch teeth 122 also are carried by the sleeve shaft 114 although they are spaced axially with respect to the teeth 120.

Each of the gears 66, 90, 92, 94 and 106 is formed with internal clutch teeth as indicated, respectively, by reference numerals 124, 126, 128, 130 and 132. The sleeve 114 is slidably splined to a clutch element 134. Relative angular motion of clutch element 134 with respect to sleeve shaft 114 is prevented by the splined connection which includes an internally splined opening in the element 134. Sleeve shaft 114 can be moved longitudinally, however, with respect to clutch element 134. The internal spline teeth formed in the element 134 are of sufficient depth to allow the clutch teeth 122 to pass through the internally splined opening of element 134.

Element 134 is journalled by means of a bushing 136 within a bearing opening 138 formed in the center support 48. Axial displacement of element 134 with respect to the housing 18 is prevented by a radial needle thrust bearing 140 and by a thrust washer 142, the latter being held in place by a snap ring as indicated.

Also surrounding portion 108 of the power output shaft 24 is a sleeve shaft 144 which is connected to the right-hand end of sleeve shaft 114 by means of a rotary connection 146. This connection includes a pair of juxtaposed annular grooves of semi-circular cross-section and a series of steel balls located in the grooves. The balls are held in place by a suitable cage. Thus the rotary connection 146 will accommodate relative rotation of sleeve shaft 144 with respect to sleeve shaft 114, although the two sleeve shafts will move in unison in a longitudinal direction.

Sleeve shaft 144 is internally splined to permit a sliding spline connection at 148 with an externally splined portion of power output shaft 24. Shaft 24 can be formed with a detent opening 150 which receives a detent ball 151, the latter being adapted to engage any one of a series of detent recesses formed in the interior of sleeve shaft 144. These recesses are indicated by reference numerals 152, 154, 156, 158, 160 and 162. These recesses, respectively, correspond to the high speed ratio position of sleeve shaft 144, the intermediate speed ratio position, a neutral position, a low speed ratio position, a second neutral position, and reverse drive position. Detent recess 153 corresponds to the limiting position of sleeve shafts 114 and 144, as shown in FIGURE 1A. The sleeve shaft 144 can be shifted axially, as will be explained subsequently, to provide speed ratio changes.

Clutch operating sleeve shaft 164 surrounds the sleeve shaft 144. The left-hand end of sleeve shaft 164 is connected to clutch element 134 by means of a rotary connection 166. This connection corresponds in structure to the connection 146 between the sleeve shafts 144 and 114. Connection 166 will permit relative rotation of sleeve shaft 164 with respect to the clutch element 134, but the sleeve shaft 164 is inhibited from axial movement by the connection 166.

A clutch operating clamping ring 168 is carried by the sleeve shaft 164. It is situated directly adjacent clutch discs 170 and 172, which form a part of a multiple disc clutch assembly 174. Discs 170 are internally splined to the peripheral portion 176 of the clamping ring 168.

A clutch clamping member surrounds the multiple clutch disc assembly 174. It includes an annular pressure ring 180 located on one side of the clutch disc assembly 174. Splined to the outer periphery of the clamping member 178 is a cam 182 which is formed, as viewed in FIGURES 2, 3, 4 and 5, with cam projections 184. These are received within cam recesses 186 formed in a clutch member 188. Cam 182 also has formed therein a series of cam recesses 190 within which cam rollers 192 are situated. These rollers are supported by pins 194 which are received within pockets 196 of semi-circular cross-section. The pockets 196 are formed in the clamping plate 168 at angularly spaced locations.

A clutch engaging spring 198 is interposed between clutch member 188 and the clamping ring 168.

Clutch element 188 is internally splined at 200 to the sleeve shaft 164. Sleeve shaft 164 in turn is splined at 202 to the sleeve shaft 144 which is splined at 148, as mentioned earlier, to the power output shaft 24.

The clutch member 188 surrounds the sleeve shaft 164 and is splined to it, as previously indicated. It is formed at its hub with an enlarged diameter portion 204 which has an inside diameter larger than the root diameter of the splines at 200. The sleeve shaft 164 is formed with radial openings 206 within which balls 208 are located.

A series of detent recesses is formed in the outer surface of the sleeve shaft 144 as indicated at 210, 212, 214, 216, 218, 220 and 222. These recesses are adapted to receive the balls 208 as the sleeve shaft 144 is shifted longitudinally from one position to another.

When the balls 151 register with recess 153, the sleeve shaft 144 assumes a high speed ratio position. When they register with recess 153, sleeve shaft 144 assumes an overdrive position. When they register with recesses 156 and 160, the sleeve shaft 144 assumes a neutral position.

When balls 208 register with recesses 154, the sleeve shaft 144 assumes the intermediate speed ratio position. When they register with recesses 158, sleeve shaft 144 is in the low speed ratio position. It is in the reverse drive position when balls 208 register with recesses 162.

When the splines 200 contact balls 208, they are restrained from moving radially outwardly and are held securely in one or another of the registering recesses 210, 212, 214, 216, 218, 220 and 222. This prevents relative sliding movement between the sleeve shaft 144 and the sleeve shaft 164 whenever the transmission is conditioned for torque delivery and the clutch disc assembly is applied.

When the clutch release member 188 is shifted in a left-hand direction, the large diameter portion of its hub becomes aligned with balls 208, thereby making it possible for the balls 208 to assume the position shown in FIGURE 2 where they engage the tops of the teeth of spline 202 on shaft 144. When the balls assume this position, sleeve shaft 144 can be shifted relative to sleeve shaft 164.

Member 188 can be adjusted in a left-hand direction, as viewed in FIGURES 1 and 2, by means of an annular piston 224 slidably positioned within a sleeve 226. This sleeve is fitted within a cylindrical opening 228 formed in the housing portion 20. Disposed within the sleeve 226 is a cylinder member 230 which cooperates with the sleeve 226 to define an annular cylinder within which the annular piston 224 is situated. The cylinder and the piston cooperate to define a pressure chamber which is in fluid communication through a port 232 with a pressure conduit 234. Conduit 234 in turn extends to a master hydraulic cylinder 236 operated by a driver-actuated clutch pedal 237.

As the clutch pedal is depressed, piston 224 is moved in a left-hand direction as viewed in FIGURES 1A, 2, 3, 4 and 8.

The longitudinally directed forces acting on the piston 224 are transferred to clutch member 188 through a thrust bearing 191.

The sleeve 144 is adapted to be shifted in a longitudinal direction by means of a fork 238 having a pair of fork ends 240 that are received within an annular groove 242 formed on the right-hand end of the sleeve 144. Fork 238 is fixed to a shift rail 244, as seen in FIGURES 1A, 1B and 4, which is slidably positioned within an opening 246 formed in a boss 248 in the interior of the housing portion 22. Rail 244 extends outwardly, as seen in FIGURE 1B, to facilitate a connection with a driver-operated ratio shift linkage mechanism.

The transmission mechanism as illustrated in FIGURE 1A is conditioned for overdrive operation. Under these conditions engine torque is delivered to power input gear 66 from shaft 56. Gear 66 drives the cluster gear assembly 70 whereby driving torque is delivered from overdrive gear element 78 to overdrive gear 106. The teeth 122 are engaged at this time with overdrive gear teeth 132. Thus clutch member 134 is driven with the sleeve shaft 114. The torque applied to shaft 114 is distributed through multiple disc clutch assembly 174. Sleeve shaft 164, which is splined to the driven shaft 24 through the splined sleeve shaft 144, is capable of rotating with shaft 24, but is held fast against relative movement in a longitudinal direction. It thus serves as a reaction member for the driving torque. As the cam rollers 192 ride along the ramps of cam recesses 190, the magnitude of the clamping effort applied to the clamping ring 168 by reason of the camming action of the rollers 192 is proportional to the magnitude of the torque being transferred through the engaged multiple disc clutch assembly 174. When the clutch assembly 174 is engaged in this fashion, the driven shaft 124 rotates at the same speed as the overdrive gear 106. In a preferred form of my invention, the overdrive speed ratio is .7621:1.

To produce a speed ratio change from the overdrive ratio to the high speed direct drive ratio, the sleeve 114 is moved in a right-hand direction until teeth 120 engage teeth 124. At that time teeth 122 disengage teeth 132. The internal splines of clutch member 134 are of sufficient depth to permit the passage therethrough of teeth 132 as indicated previously. Engine torque then is delivered from shaft 56 and through the engaged clutch teeth 120 and 124 to the sleeve shaft 114. The driving torque then passes directly from the sleeve shaft 114 and through the engaged multiple disc clutch assembly 174 to the driven shaft 24 as described previously.

The sleeve shaft 114 is moved from the position shown in FIGURE 1 to the high-speed ratio position by adjusting the shift rail 244 in a right-hand direction. This causes sleeve 144 to move longitudinally. The rotary connection 146 causes sleeve shaft 114 to follow the motion of sleeve shaft 144 while accommodating relative rotation therebetween. When the high speed ratio position is achieved, detent ball 151 registers with detent recess 152.

When the sleeve shaft 114 is shifted further in a right-hand direction, teeth 120 disengage teeth 124 and engage teeth 126. This establishes an intermediate speed ratio torque delivery path which is defined by the shaft 56, gear 66, gear element 68, gear element 72, gear 90, sleeve shaft 114, multiple discs clutch assembly 174, sleeve shaft 164, sleeve shaft 144 and power output shaft 24. As in the case of high speed ratio operation and low speed ratio operation, the camming action of the cam rollers 192 causes the multiple disc clutch assembly 174 to engage with a clutch engaging force that is proportional in magnitude to the torque being delivered through it.

Low speed ratio operation is achieved by shifting teeth 120 out of engagement with teeth 126 and into engagement with teeth 128. The torque delivery path then is defined by shaft 56, gear 66, gear element 68, gear element 74, gear 92, sleeve shaft 114, clutch assembly 174, sleeve shafts 164 and 144 and power output shaft 24.

To obtain reverse drive operation the sleeve 114 is shifted farther in a right-hand direction until teeth 120 engage teeth 130. Power input shaft 56 then drives the cluster gear assembly 70 through gear 66. Gear element 76 drives pinions 96, which in turn drive reverse gear 94, the direction of rotation of gear 94 being opposite to the direction of rotation of shaft 56. The reverse torque applied to gear 94 then is transferred through sleeve shaft 114 and through the multiple disc clutch assembly 174 to the sleeve shafts 164 and 144 and hence to the power output shaft 24.

The cam rollers 192 are capable of establishing a clamping action on the friction discs of the multiple disc clutch assembly 174 notwithstanding a reversal in the direction of the motion of the clutch elements. This is because of the double ramp provided by the cam recesses 190, as indicated best in FIGURES 4 and 5.

When the sleeve shaft 114 is shifted to a neutral position so that the teeth 120 are situated between the low speed ratio position and the intermediate speed ratio position, teeth 120 are disengaged from both teeth 126 and teeth 128. This interrupts the torque delivery path between the shaft 56 and the sleeve shaft 114. This neutral condition is established also when the teeth 120 are positioned between the reverse drive position and the low speed ratio position.

When the transmission is delivering torque in any of the several speed ratios, the shift lock member 188 is urged in a right-hand direction by reason of the camming action of cam projections 184 with the cam surfaces of cam recesses 186. This is seen in FIGURE 1A. This causes the balls 208 to block the sleeve shaft 144 against movement relative to the sleeve shaft 164.

If it is desired to effect a ratio change from the overdrive ratio to the high speed direct drive ratio, the vehicle operator actuates the clutch pedal operated hydraulic master cylinder 236, thereby distributing fluid under pressure to the working chamber behind annular piston 224. This causes the member 188 to be shifted in a left hand direction, as illustrated in FIGURE 3. As it is shifted, the cam projections 184 and the cam recesses 186 cause the clutch element 182 to become centered so that the cam rollers 192 will be positioned at the apex of the ramps of the cam recesses 190. This relieves the clamping pressure on the clutch discs 174 thereby interrupting the torque delivery path at that point. Having interrupted the torque delivery path, the operator then can shift the sleeve shaft 144 in a right hand direction. At that time the balls 208 register with the large diameter portion of the central opening formed in member 188 to release the shift lock. The sleeve shaft 144 shown in FIGURE 2 is in the position it assumes during a ratio transition. After the sleeve shaft 144 and the sleeve shaft 114 are shifted to the high speed ratio position, detent ball 151 registers with detent recess 152. The operator then relieves the pressure on the clutch pedal, thereby relieving the pressure behind annular piston 224. Spring 198 then causes an initial clamping pressure on the clutch discs of clutch disc assembly 174. The clamping pressure is applied to the discs through the clamping ring 180 carried by the member 178. As clamping pressure is applied in this fashion, element 188 again is shifted in a right-hand direction, thereby establishing a shift lock between sleeve shaft 164 and sleeve shaft 144 which prevents relative motion therebetween. After initial clutch engaging pressure of the spring 198 establishes partial clutch engagement, a torque transfer takes place between sleeve shaft 114 and the power output shaft 24. This again establishes a camming action between the cam rollers 192 and the cam recesses 190. This condition is illustrated in FIGURE 2 where the cam rollers 192 ride back up the ramp for the cam recess 190. At the same time cam projections 184 become withdrawn from cam recess 186. The member 188 which provides a shift lock then is returned to the position shown in FIGURE 1 to inhibit again relative longitudinal movement of the sleeve shaft 144 with respect to sleeve shaft 164. It is seen, therefore, that a ratio shift can occur in a synchronous fashion with a maximum degree of smoothness. The moment of inertia of the relatively movable portions of the mechanism just prior to a ratio shift is slight. For example, although sleeve shaft 114 is rotating just prior to a shift at a speed that differs from the speed of the gear with which it is to be engaged, the teeth 120 can engage the teeth of any one of the gears 66, 90, 92 or 94 with a minimum amount of clashing. The portion of the clutch structure having a relatively large mass and moment of inertia is disconnected from the sleeve shaft 114 at this time by the multiple disc clutch assembly 174. It is only after the clutch teeth 120 become fully engaged with the internal teeth of the torque output gears of the gear 166 that the clutch becomes engaged, thereby establishing a smooth, continuous, power flow path from the power input shaft 56 to the power output shaft 24.

Speed ratio changes between any of the other speed ratios is accomplished in a similar fashion. For example, during a speed ratio change from a low speed ratio to the intermediate speed ratio, the operator depresses the clutch pedal, thereby introducing clutch release pressure behind the piston 224. This again causes member 188 to shift thereby establishing registry between cam projections 184 and cam recesses 186. This causes the cam plate 168 to become centered with respect to the clutch element 182 so that the cam rollers 192 are relieved of their camming action which causes disengagement of the multiple disc clutch assembly 174. The resistance offered by the balls 208 are released automatically as explained previously. Thus the operator may shift the sleeve shafts 144 and 114 until the teeth 120 move out of engagement with teeth 128 and into engagement with teeth 126. Again any gear clashing during engagement is a minimum since the sleeve shaft 114, which is of relatively reduced mass, is disconnected from the rotary portions of the clutch mechanism which have a relatively large mass. After engagement of the teeth 120 and the teeth 126 is complete, the operator again may cause the clutch to engage by relieving the pressure from behind the piston 224. Following initial engagement of the clutch disc by the spring 198, full clutch engagement is produced by reason of the camming action of the cam rollers 192.

In FIGURE 3 I have illustrated the relative positions of the cam rollers 192 and the clamping ring 168 with respect to the element 188 when the clutch discs are worn. In contrast, these parts assume relative positions as shown in FIGURE 4 when the clutch plates are new. It is apparent from comparing FIGURES 3 and 4 that the clutch structure is self-compensating for wear.

Full clutch engagement occurs following release of pressure from behind piston 224 regardless of the degree of wear of the clutch disc since the cam rollers 192 are allowed to ride along the ramps for cam recess 190 to an extent that is always sufficient to permit clutch engagement.

Having thus described a preferred form of my invention, what I claim and desire to secure by U.S. Letters Patent is:

1. A power transmission mechanism for delivering driving torque from a driving member to a driven member comprising a power input gear connected to said driving member, a plurality of cluster gear assemblies mounted for rotation about axes parallel to the axis of said power input gear, torque output gears mounted for rotation about the axis of said power input gear and arranged in meshing engagement with said cluster gear assemblies, said torque output gears having formed thereon clutch teeth, a clutch shaft mounted concentrically with respect to said torque output gears, said clutch shaft having clutch teeth formed thereon, means for shifting said clutch shaft longitudinally with respect to the axis of said output gears whereby its clutch teeth engage selectively the teeth of said output gears, a friction clutch assembly adapted to establish a driving connection between said clutch shaft and said driven shaft comprising a clutch input element drivably connected to said clutch shaft, a clutch output element, juxtaposed friction members carried respectively by said clutch input element and said clutch output element, a clutch reaction ring having a portion situated adjacent said friction members, means for applying a clutch engaging force to said friction members, a driving connection between said clutch output element and said driven member, and means for overruling the influence of said clutch force applying means whereby said friction members become disengaged to permit said clutch shaft to be shifted in the direction of the axis of said output 2. The combination as set forth in claim 1 wherein said clutch assembly includes a rotary connection between said clutch output member and a relatively stationary portion of said mechanism whereby said clutch output member is adapted for rotary motion although longitudinal motion thereof is inhibited.

3. The combination as set forth in claim 1 wherein said overruling means comprises a personally controlled clutch release element mechanically engageable with said clutch reaction ring as it is shifted to a clutch releasing position, and a shift lock between said clutch output member and said clutch shaft comprising cooperating detent elements carried by said output member and by a portion of said clutch shaft, said clutch release element engaging one of said detent elements as said release element is retracted to a clutch engaging position.

4. The combination as set forth in claim 1 wherein said clutch assembly includes a first rotary connection between said clutch output member and a relatively stationary portion of said mechanism whereby said clutch output member is adapted for rotary motion although a longitudinal motion thereof is inhibited, said overruling means comprising a personally controlled clutch release element mechanically engageable with said clutch reaction ring as it is shifted to a clutch releasing position, and a shift lock between said clutch output member and said clutch shaft comprising cooperating detent elements carried by said output member and by a first portion of said clutch shaft, said clutch release element engaging one of said detent elements as said release element is retracted to a clutch engaging position, a second rotary mechanical connection between the first portion of the clutch shaft on which said detent recesses are formed and a second portion of said clutch shaft on which said clutch teeth are formed, said rotary connection being adapted to accommodate relative rotation between said clutch shaft portions while inhibiting relative longitudinal motion therebetween.

5. The combination as set forth in claim 1 wherein said torque output gears include an overdrive gear, an overdrive gear element on said cluster gear assembly engaging said overdrive gear, and positive drive clutch means for establishing a direct drive connection between said overdrive gear and said clutch shaft as the latter is shifted to an overdrive position.

6. The combination as set forth in claim 2 wherein said torque output gears include an overdrive gear element on said cluster gear assembly engaging said overdrive gear, and positive drive clutch means for establishing a direct drive connection between said overdrive gear and said clutch shaft as the latter is shifted to its overdrive position.

7. The combination as set forth in claim 3 wherein said torque output gears include an overdrive gear element on said cluster gear assembly engaging said overdrive gear, and positive drive clutch means for establishing a direct drive connection between said overdrive gear and said clutch shaft as the latter is shifted to its overdrive position.

8. The combination as set forth in claim 4 wherein said torque output gears include an overdrive gear element on said cluster gear assembly engaging said overdrive gear, and positive drive clutch means for establishing a direct drive connection between said overdrive gear and said clutch shaft as the latter is shifted to its overdrive position.

9. The combination as set forth in claim 1 wherein said separating means comprises spring means for normally urging said reaction ring and said clutch output element together and cam means for clamping together said clutch output element and said reaction ring comprising registering cam portions respectively carried by said clutch output element and said reaction ring whereby a clamping force is applied to said friction members upon relative angular displacement of said reaction ring with respect to said clutch output element.

10. The combination as set forth in claim 2 wherein said separating means comprises spring means for normally urging said reaction ring and said clutch output element together and cam means for clamping together said clutch output element and said reaction ring comprising registering cam portions respectively carried by said clutch output element and said reaction ring whereby a clamping force is applied to said friction members upon relative angular displacement of said reaction ring with respect to said clutch output element.

11. The combination as set forth in claim 3 wherein said separating means comprises spring means for normally urging said reaction ring and said clutch output element together and cam means for clamping together said clutch output element and said reaction ring comprising registering cam portions respectively carried by said clutch output element and said reaction ring whereby a clamping force is applied to said friction members upon relative angular displacement of said reaction ring with respect to said clutch output element.

12. The combination as set forth in claim 4 wherein said separating means comprises spring means for normally urging said reaction ring and said clutch output element together and cam means for clamping together said clutch output element and said reaction ring comprising registering cam portions respectively carried by said clutch output element and said reaction ring whereby a clamping force is applied to said friction members upon relative angular displacement of said reaction ring with respect to said clutch output element.

13. A power transmission mechanism adapted to deliver driving torque from an engine crankshaft to a driven shaft comprising torque transmitting gearing capable of establishing multiple torque delivery paths of varying torque ratios, said gearing comprising a power input element connected directly to said engine crankshaft, a plurality of torque output gears mounted coaxially with respect to said input gear, a cluster gear assembly meshing with said input gear and said output gears and mounted for rotation about an axis that is parallel to the axis of said output gears, said output gears having clutch teeth formed thereon, a clutch shaft mounted for longitudinal movement with respect to the axis of said output gears, said clutch shaft having formed thereon clutch teeth adapted to engage selectively the teeth of said output gears as said clutch shaft is moved from one axial station to another in a longitudinal direction, a friction clutch means for connecting drivably said driven member and said clutch shaft, means for shifting said clutch shaft from one position to another to establish each of several torque delivery paths and means for selectively engaging and disengaging said clutch means during a ratio shifting sequence to interrupt the torque delivery path between said clutch shaft and said driven member as the clutch teeth on said clutch shaft are brought into registry with the companion teeth of said output gears.

14. The combination as set forth in claim 13 wherein said clutch means comprises torque input and torque output clutch discs, the torque input discs being connected drivably to said clutch shaft, a clutch output member, said clutch output discs being connected to said clutch output member, a clamping element having a portion adjacent said clutch discs, cam means for forcing said clutch output member and said clamping element together upon relative angular displacement therebetween whereby the degree of clamping effort applied to said clutch discs is proportional to the torque being delivered therethrough, a sleeve shaft surrounding said driven member and splined thereto, said sleeve shaft being splined also to said clutch output member, a rotary connection between said sleeve shaft and said clutch shaft whereby said sleeve shaft may rotate relative to said clutch shaft although relative longitudinal movement therebetween is prevented, and means for longitudinally moving said sleeve shaft following disengagement of said clutch means.

15. The combination as set forth in claim 14 wherein said clutch engaging and disengaging means comprises a clutch release element mechanically engageable with said clamping element and adapted to shift the latter to a clutch releasing position upon movement thereof in one direction, a fluid pressure servo comprising a movable piston engageable with said clutch release element and means for introducing fluid under pressure to said servo to effect clutch disengagement during speed ratio changes.

16. The combination as set forth in claim 14 wherein said clutch means comprise further a sleeve shaft surrounding said driven member and splined thereto, said sleeve shaft being splined also to said clutch output member, a rotary connection between said sleeve shaft and said clutch shaft whereby said sleeve shaft may rotate relative to said clutch shaft although relative longitudinal movement therebetween is prevented, and means for longitudinally moving said sleeve shaft following disengagement of said clutch means.

References Cited

UNITED STATES PATENTS

| | | | |
|---|---|---|---|
| 1,947,033 | 2/1934 | Bush | 74—372 |
| 2,763,350 | 9/1956 | Klaue | 192—3.5 |
| 3,283,613 | 11/1966 | Perkins | 74—331 |

FOREIGN PATENTS 650,577  2/1951  Great Britain.

DONLEY J. STOCKING, *Primary Examiner.*

H. S. LAYTON, *Assistant Examiner.*